Nov. 30, 1948.                    C. C. CRICK                    2,455,234
                    METHOD OF CONSERVING AND DELIVERING WATER
Filed Jan. 15, 1946                                          6 Sheets-Sheet 5
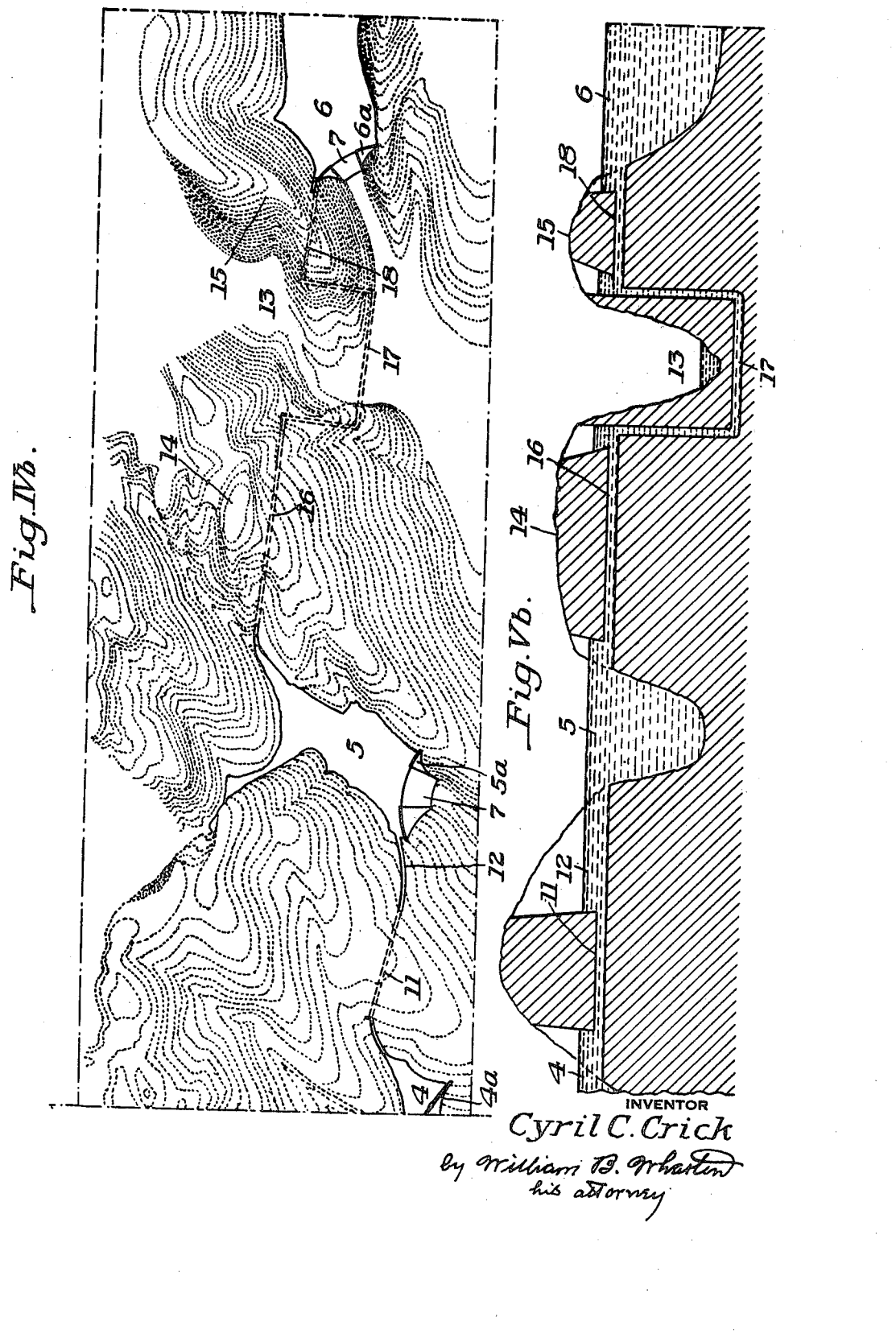
INVENTOR
Cyril C. Crick
by William B. Wharton
his attorney Nov. 30, 1948.   C. C. CRICK   2,455,234
METHOD OF CONSERVING AND DELIVERING WATER
Filed Jan. 15, 1946   6 Sheets-Sheet 6
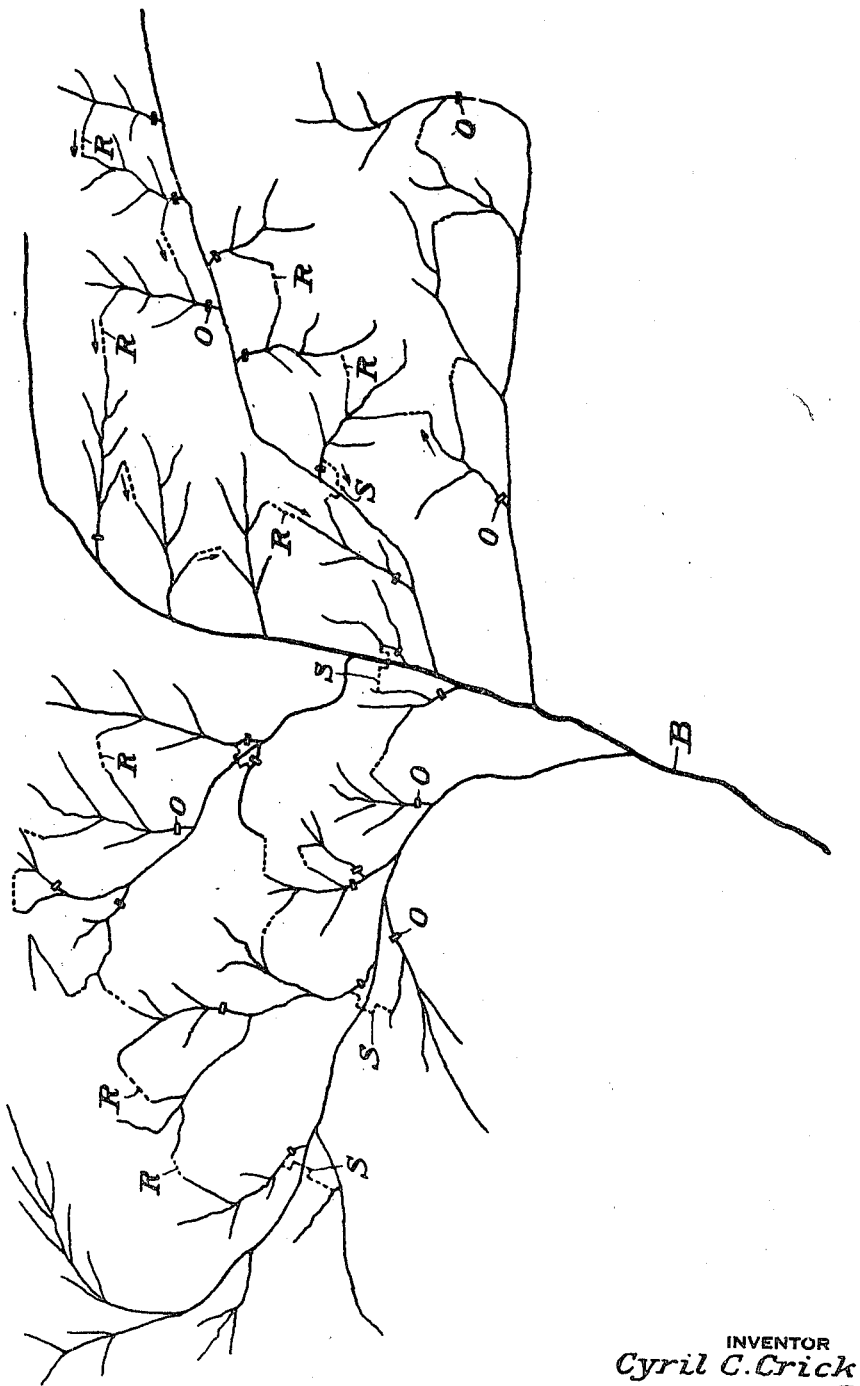
INVENTOR
Cyril C. Crick
by William B. Wharton
his attorney Patented Nov. 30, 1948

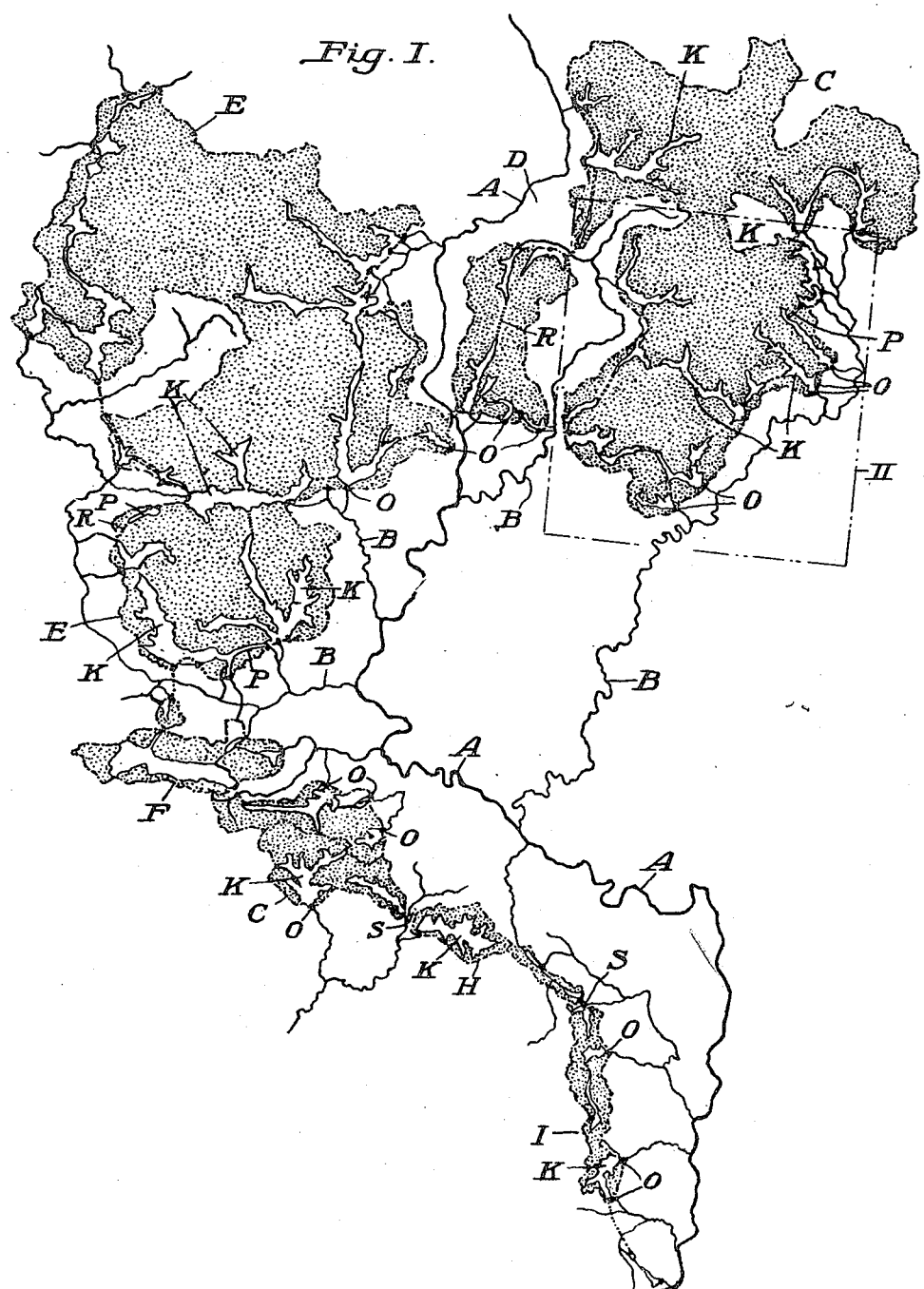

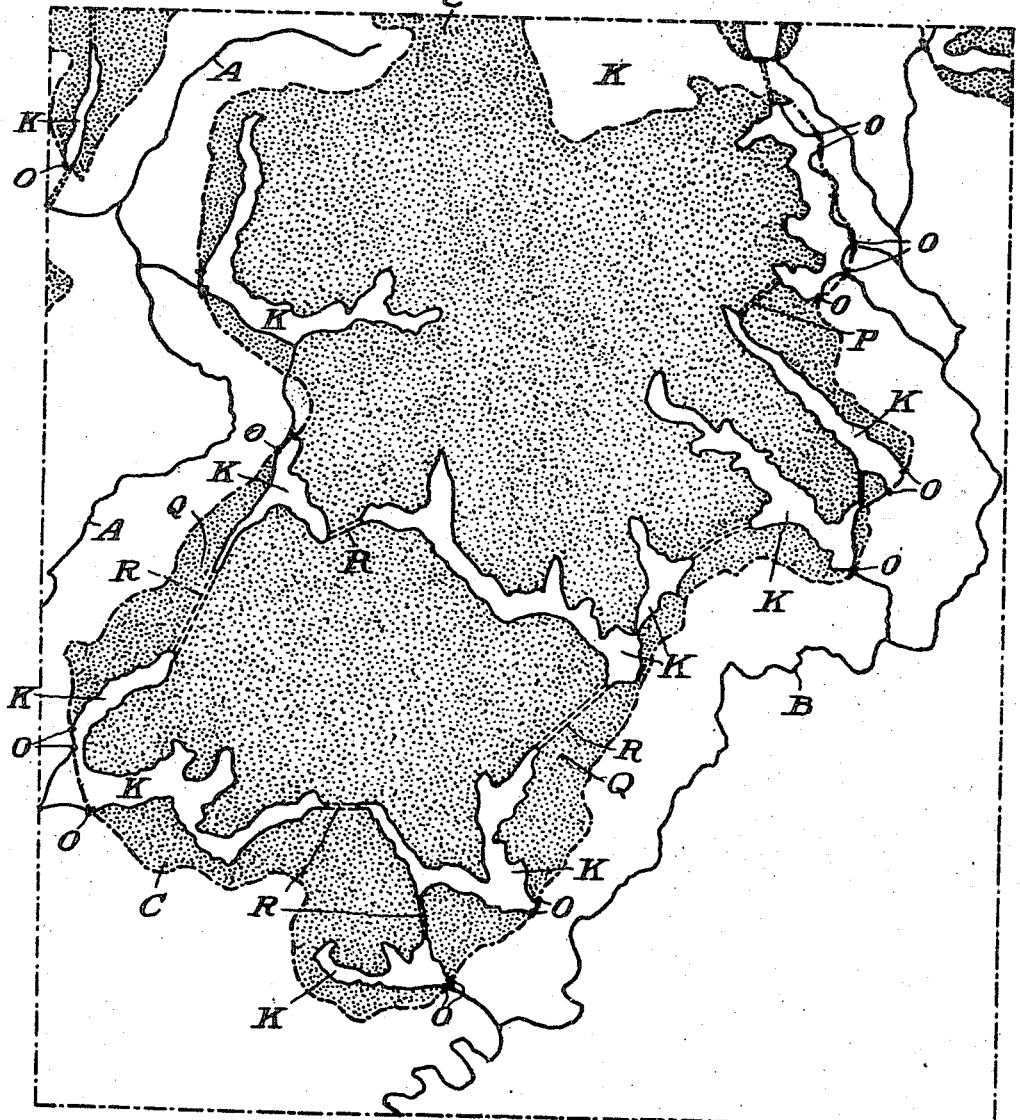
Fig. II.

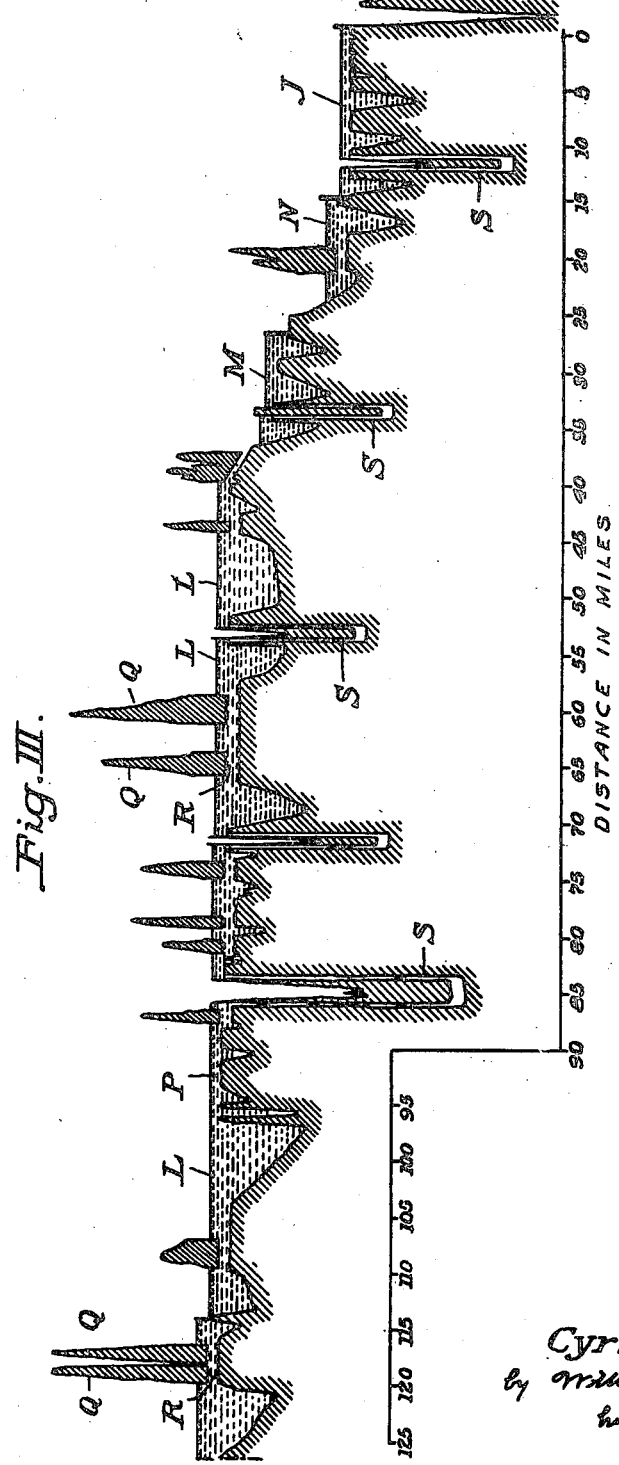
Fig. III.

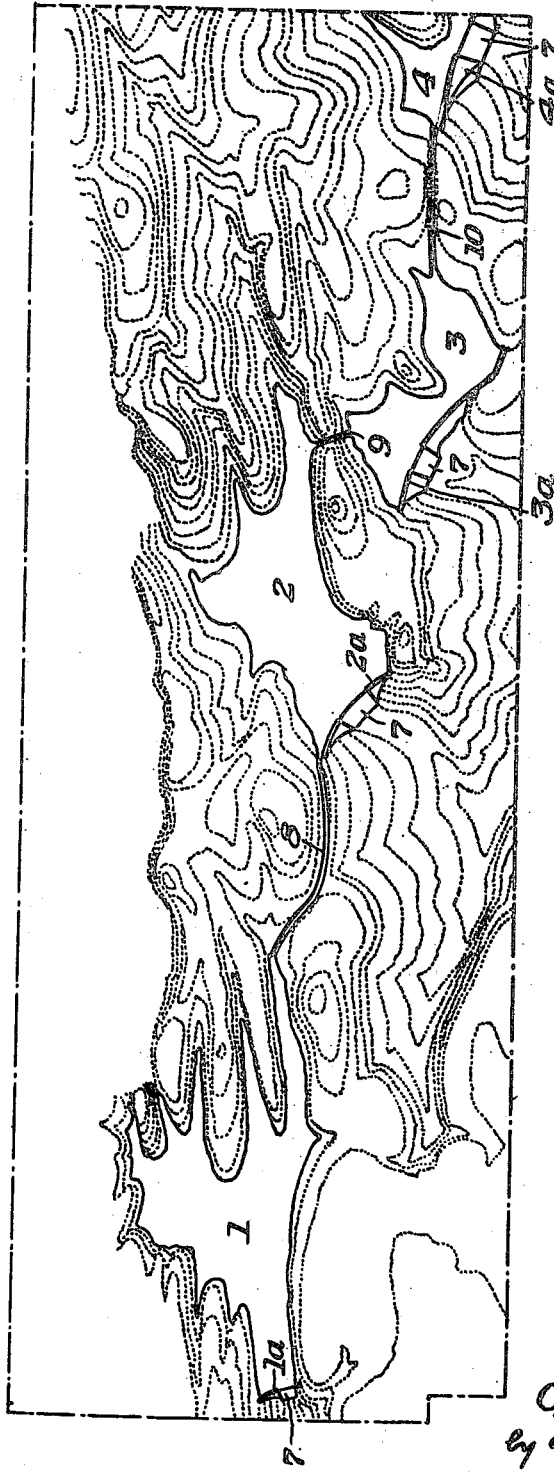
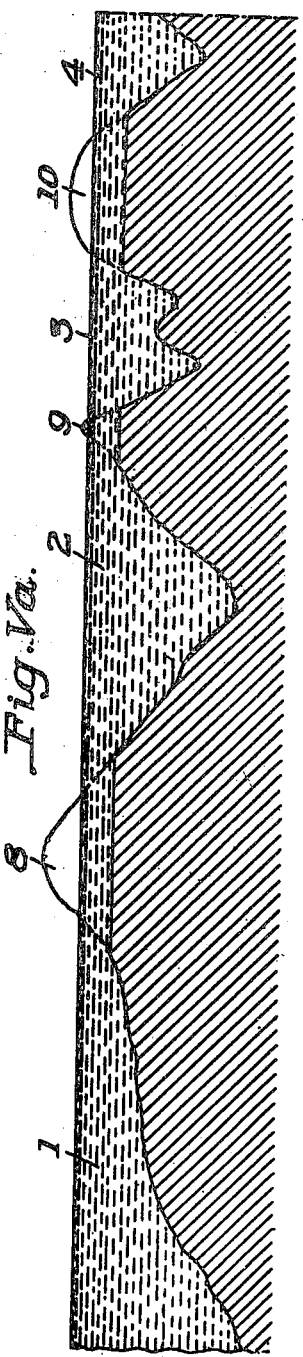
Fig. IVa.
Fig. Va.

2,455,234

UNITED STATES PATENT OFFICE 2,455,234

METHOD OF CONSERVING AND DELIVERING WATER

Cyril C. Crick, Pittsburgh, Pa.

Application January 15, 1946, Serial No. 641,230

16 Claims. (Cl. 61—1)

This invention relates primarily to a method of conserving water in large quantities, and of delivering the water at will throughout a widely extended area.

It is a general geographical fact that the source areas for the large watercourses comprise irregular terrain with a natural drainage into a number of natural basins, or valleys. The regions in which population is densest and industries are centered usually are located at lower levels and along the major watercourses of the region into which the waters of the source areas drain. In those major watercourses the water level varies widely from year to year as well as during each year, in accordance with the total current rainfall in the source areas; and the water as it arrives at the centers of population and industry usually is contaminate.

There have been previous attempts to normalize the water level in the major watercourses as an aid to navigation and to prevent floods, to give an adequate supply of water at the centers of population, and to provide a substantial supply of water in uncontaminate condition, by placing dams in a plurality of watercourses tributary to the larger rivers and in the head waters of those rivers. Such attempts to obtain those desirable conditions have been inadequate, because any such expedient gives merely a plurality of isolated basins the capacity of which is limited to the height of each individual dam and the contour capacity of the valley in which it impounds water. At times of heavy rainfall in the area draining into any one basin, any excess over the capacity of the individual basin is lost. The same condition exists if a number of dams are placed at progressively lower levels along the line of a watercourse and the branches by which it is fed.

The upland areas naturally have waters which if suitably delivered to the centers of utilization would fulfill all requirements of domestic and industrial use, but because of the irregularity of their delivery and their subjection to contamination the utility of those waters is in great measure nullified. Those upland areas in which there are a great number of watercourses in the form of runs, creeks and small rivers are naturally well adapted to the collection and storage of water. I have observed that in some instances watercourses which convey only a small quantity of water lie in valleys which have potentially great volumetric capacity, and that the general arrangement of watercourses is for the larger watercourses to lie in general parallelism or with downstream convergence, with the branching smaller, or feeder, runs and creeks of each of the larger streams frequently approaching close to similar feeders of other of the larger watercourses. I have discovered that advantage of these topographical conditions may be taken, to provide large volume delivery of water at widely separated points. The sort of storage which I create results in normalizing the volume of flow through the major watercourses with consequent advantages in navigation and in flood prevention; and provides numerous other advantages, as in the generation of electric power and in the conveyance of the water by extension to points at which it is delivered.

Employing the method of my invention I collect waters over a wide area and render the waters so collected available around the periphery of that area. This I do primarily by such novel utilization of impounding and interconnecting instrumentalities that I establish in a collection area adapted to the practice of my invention an interlocked basin system so organized that rainfall in any region of the included area may flow to all bodies of water impounded and interlocked in the area. By so doing I tend to cause an averaged rise in surface level throughout the entire basin system, to give a collection area in which the waste of rainfall is reduced to a minimum. In such interlocked basin system I minimize loss of head by corrective interchanging flow between the impounded bodies of water, and in effect convey water from one locality to a remote locality providing for direct withdrawal from all bodies of water in the system by tapping any one of the component bodies. In establishing such interlocked basin system I can, when necessary or desirable, by-pass certain watercourses and areas.

Where water is to be delivered at a particularly great distance from the most remote body of impounded water brought into an aqueduct system, it may be desirable to utilize a plurality of such basin systems. If I include a plurality of basin systems in a general aqueduct system, those several basin systems may lie in the same or at different general topographical levels. In any event, however, the primary unit created by the practice of my method is the interlocked basin system, or area, comprising a plurality of bodies of water between which there is free interchanging and equalizing flow.

In the accompanying drawings illustrative of my invention:

Fig. I is a plan view in the nature of a map, showing a theoretical multi-basin-system aqueduct organized and operative in accordance with the method of my invention.

Fig. II is a similar plan view in the nature of a map, showing on an enlarged scale an arbitrarily selected portion of the more extended map of Fig. I, this portion being indicated on Fig. I by the outline designated II.

Fig. III is a vertical section or profile view taken along the aqueduct system illustrating typical conditions in the district shown in Fig. I, the relative proportions being distorted in such order that the same unit of length has a horizontal value several thousand times into vertical value, and no attempt being made accurately to proportion the horizontal extent of the details to any actual or contemplated practice.

Figs. IVa and IVb are interrelated schematic contour drawings which when taken together show a basin system, or portion of such system, in a manner to illustrate the damming of the water-courses which form the several reservoirs, and an interconnection of the reservoirs providing free interchanging flow of water throughout the system.

Figs. Va and Vb are sectional schematic views through the hypothetical basin system, or portion of such system, shown in Figs. IVa and IVb.

Fig. VI is a schematic plan of a drainage area of a sort particularly adapted to the practice of my invention, indicating the practice of that invention therein.

Referring initially to Figs. I, II and III of the drawings, showing an aqueduct system established in a district taken to illustrate practice under the method of my invention, letter of reference A designates the main river of the district, and reference letter B designates the main feeder streams or tributaries of that river. As shown, I exclude the river A itself, and all or a portion of the larger tributaries B, from the aqueduct system. In Fig. I the several shaded regions C, D, E, F, G, H, and I show general areas in which the method of my invention is conducted. It is to be understood that these several shaded areas do not delimit individual basin systems, but merely indicate the general areas included in a theoretical aqueduct system and indicate the inter-connection of watercourses by which a plurality of basin-systems are brought together in such aqueduct. In this figure of the drawings individual reservoirs are designated generally by reference letter K. The districts outside the shaded areas may be considered as watercourses, or lengths of watercourses, and areas, excluded because of land mass or valley conditions, because of population centers or engineering works, or because they contain waters which are unduly contaminate.

A portion of the aqueduct system of Fig. I is shown in the profile view forming Fig. III of the drawings. In that profile there is shown a single greatly extended basin system L which includes the watercourses comprised in the shaded areas G and H, of Fig. I, and a large portion of the area I. In this basin system L, there is such interconnection between the several bodies of water that a tendency for equalizing interchanging flow is maintained throughout the basin system. From this basin system L there are sequential drops to lower-lying basin systems M and N, with a final drop in the level of group J. It will be seen in the profile view of Fig. III that I maintain an approximate uniformity in the surface level of the water in the reservoirs of each basin system. This involves the creation of a continuing tendency for the several interconnected bodies to interchange their waters in seeking a common surface level, and control of that common surface level; with accommodation to irregularity in the levels of the beds of the individual basins interconnected in the basin system to irregularity in the periods and quantities of rainfall, irregularity in the discharge from the watercourses emptying into the several basins and in the quantity of localized rainfall received directly or as run-off by the several basins.

Figs. I and II of the drawings indicate the insertion of dams O of appropriate height in the several watercourses, as will be explained in more detail later herein. It also appears in Fig. III that I establish continuity of surface level in the interconnected basins of a basin-system by a variety of expedients, to maintain a flow of water in both directions to and from the several interconnected reservoirs of a basin system. In the showing of Fig. III open cutting is designated by reference letter P, and tunneling to provide ducts through hills or elevated regions Q is designated by reference letter R. It will be noted that at several points I use an inverted siphon S to interconnect included bodies of water.

Throughout each basin system I create such conditions that the waters in the several reservoirs of the basin system are caused to seek a common surface level, and control that level. Dams used in so doing are brought individually to such height above the beds from which they rise, that accommodation is made to the establishment of a common surface level of water in those basins included in a basin system which differ most widely in the level at which their beds lie. In such manner I impound the waters of each basin system in a multiplicity of basins or reservoirs, some of which may be a great depth and which in many respects function as a single body of water. Such organization has all the advantages derived from storage over widespread areas, and has additional advantage both in the depth of water in the storage reservoirs and in the utilization of a plurality of areas naturally adapted to the storage of water. It provides a storage capacity equal to the sum of the capacities of all the reservoirs included in the system, and which total capacity is available for the storage of sporadic or continued rainfall in large or small quantity occurring at any locality in the total area embraced by the basin system.

My invention is illustrated by Figs. IVa and IVb of the drawings, which taken together show six impounded bodies of water designated by reference numerals 1, 2, 3, 4, 5, and 6. These I form by inserting in the natural watercourses of the locality the several dams 1a, 2a, 3a, 4a, 5a and 6a which cause the waters in the several watercourses to back up in the valley system in which each watercourse is comprised. As shown for purposes of illustration, each of the dams has in its structure a spillway 7, which may be taken as limiting the depth and the surface level of the body of water which is impounded. The spillways for convenience are shown as included in the structure of the dams, although such arrangement is not in accordance with good engineering practice in large scale water-impounding installations. It is to be understood that I also provide minimum flow through the watercourses below the dams in any suitable manner, as by valved openings through the dams.

The water throughout the collection area drained by the multiple watercourses being impounded by placing dams in them, I cause the several bodies of water so impounded to seek a common surface level, by creating corrective interchanging flow through ducts interconnecting them in response to tendencies toward different surface levels in the said several impounded bodies of water caused by subtractions from and additions to the volume of any of the said several bodies.

In the illustration of IVa, IVb, Va, Vb, I provide for interchanging flow between reservoirs 1 and 2 by an open duct, or canal 8; between reservoirs 2 and 3 by a canal 9; and between reservoirs 3 and 4 by canal 10. Interchanging flow between reservoir 5 is partly by a tunnel for underground duct 11 and partly by an open duct or canal 12. Between reservoir 5 and reservoir 6 there is a watercourse 13 the waters of which I exclude from the aqueduct, whereas the waters of the watercourses which are dammed to form the reservoirs 1 to 6 inclusive are all included. Hills 14 and 15 also intervene between reservoir 5 and watercourse 13 and between watercourse 13 and reservoir 6. I therefore provide interconnection between reservoirs 5 and 6 by way of an underground duct, or tunnel, 16 communicating with an inverted siphon 17 and by a tunnel 18 between inverted siphon 17 and reservoir 6. Preferably I place the interconnecting ducts at those marginal points in the interconnected reservoirs which may be most convenient with respect to the intervening distance between the bodies of water in the reservoirs and the nature of the intervening terrain.

The bottom surfaces of all the ducts of the basin system lie below the upper level of the lowest dam by which the several bodies of water are impounded, and the highest point in the bottom of that duct which is the highest defines the lowest water level of the basin system at which interchanging flow takes place. Economically it is desirable to make the bottom level of all the interconnecting ducts approximately uniform throughout the basin system.

By this communication between the several bodies of water I cause corrective equalizing flow of water in both directions, in accordance with tendencies toward different surface levels of the interconnected bodies of water, as water is withdrawn from, or received excess volume by, any one or more of them. I effect this corrective interchanging flow without substantial loss of gravity head in passing from one reservoir to another, and by means of it maintain a uniform head throughout a widespread area.

Otherwise expressed, the functioning of my method begins when the basin system as a whole has been filed to a surface level lying above the floor, or bottom, of the most highly placed duct. In none of the interconnecting ducts between basins do I find it desirable to deliver water down a declivity so great as to cause a substantial vertical drop, with abrupt loss of gravity head, through the duct. It will be clear that if this vertical drop be substantial, it will divide a proposed basin system initially, so that the proposed basin system acts as a complete whole only when the common surface level has risen to the requisite height. An abrupt vertical drop between basins also may tend to divide the intended whole into a plurality of independent basin systems during periods of long continued drought. In accordance with the showing of my drawings, which illustrate an arrangement conformable to the practice of my method, the difficulty of making extremely deep cuts to avoid substantial vertical drop through interconnecting ducts is met by making such ducts in the form of tunnels.

Thus in the multi-basin-system aqueduct shown in Figs. I to III, a basin system ends at the point where topographical conditions and practical considerations prescribe that water be delivered from one basin to another by abrupt loss of gravity head by flow over or down a declivity which gives a vertical drop so substantial that interchanging flow is not established under any conditions which reasonably may prevail in the basin systems separated by the declivity.

In the case of an inverted siphon, it is the bottom level of the approaches to the siphon which must be taken into consideration in causing the waters to seek a common surface level.

By the action illustrated in Figs. IVa, IVb, Va and Vb, the waters of all the impounded bodies interchange throughout the basin system. The stored volume of water in the basin system, a portion of which is shown, comprises the rainfall of the entire collection area which drains into the basins of the system, and maintains a controlled head and controlled large volume of water, which is available for withdrawal at all points within, or at the periphery of the basin system. Concretely stated, I thus in the practice of my method convey water for delivery at remote points by extension rather than by progressive loss of gravity head. Assuming, for example, that it may be desired to withdraw water from reservoir 3 with consequent tendency to lower the surface level of the water in that reservoir, the temporary lowering, or tendency to lower, the surface level of that reservoir tends to bring in the waters from both reservoir 2 and reservoir 4. By sequential action there is a tendency for the lowering of water in those reservoirs to draw in water from reservoir 1 on the one hand and from reservoirs 5 and 6 on the other hand.

Thus there is a conveyance of water by extension to give a controlled head and controlled volume of water available for withdrawal at any chosen point.

Assuming further, that there is localized heavy rainfall as for example on reservoir 3 and the terrain draining into it, the excess water of that rainfall also is distributed throughout the entire basin system, equally to raise the surface level of the bodies of water in all the reservoirs. Thus as the surface level of the body of water in reservoir 3 tends to rise because of addition to its volume, water tends to flow in both directions through connecting ducts 9 and 10 into reservoirs 2 and 4, and from them to flow to the other reservoirs of the system in which the surface level of the water is temporarily lower. It is to be understood that the flow of waters to and fro in a basin system does not usually follow the definite pattern which has been described. Thus there may be heavy rainfall simultaneously in two separated regions of the basin system, and under a continued withdrawal of water there may be cross tendencies established to equalize for rainfall and to equalize for withdrawal. It is improbable in view of these variables that at any instant of time the surface level of water in all the reservoirs of a basin system will lie in exactly the same horizontal plane. It will be apparent, however, that I create a constant tendency toward such equalization, by providing for interchanging flow.

It may be explained in connection with each basin system of a multi-basin-system aqueduct, and this is true throughout the extent of the aqueduct, that I can comprise in a basin system the impounded waters of a reservoir which do not appear geographically to belong to it, but the inclusion of which is topographically practical. Thus in one basin system of a generally higher level there may be an intrusion of terrain lying at a substantially lower level which more desirably is included in another interconnected system of reservoirs, or is omitted. A single basin system in a greatly extended geographical region, can provide for withdrawal of water from great distances without substantial loss of gravity head. Thus with favorable terrain, I can extend a basin system in any direction, while avoiding the submergence of population centers or engineering works, impractical land mass or valley contours, or the inclusion of waters which are unduly contaminate, while bringing the water of the basin system to and collecting water in widely separated points of utilization and collection.

In the showing of Figs. Va and Vb the interchanging flow of water to and from the several reservoirs is illustrated. The illustration of those figures of the drawings being relatively less distorted than is the showing of Fig. III, is therefore more readily understandable in connection with Figs. IVa and IVb. In these figures of the drawings which match with Figs. IVa and IVb, the same reference numerals are used to designate the same reservoirs, hills and interconnecting ducts.

Considering the waters of a basin system at the upper end of Fig. I as conveyed to the extreme lower end of the figure, that conveyance is in a greatly preponderant order by the extension of a multiplicity of broad deep bodies of water bringing water to the locations of its use without loss of gravity head except at the interconnection of basin systems lying in different topographical levels and without confinement in ducts of restricted dimensions. Only to the minimum required to provide interchanging flow between the basins of a basin system and to interconnect basin systems is it necessary to convey the water by means of interconnecting ducts. Although the showing of Figs. I and III comprises a plurality of basin systems, it is to be understood that several of those basin systems embrace very wide areas, and that it is possible by creating interchanging flow even further to extend those areas which are embraced. I have discovered that the extension of a basin system in any direction is limited only by the practical considerations involved in conforming to the topography and to existing installations and land values. In the practice of my method there is therefore great flexibility in the distance to which water is conveyed by extension as well as in the volume of water which is impounded and which is conveyed in that manner.

The possibility of tapping the basin system at any point, coupled with the great extensibility of the basin system, leads to great practical advantage in the utilization of the waters which are impounded. Thus it is possible to draw off abundant supplies of water at those points in which the utility of the water is greatest. For example a basin system can be tapped at a point of substantial abrupt declivity in terrain which is particularly suited to the generation of hydroelectric power, or at a point most favorable to the distribution of such power. Major industries requiring an abundance of water may be located to receive it at any point around or within the bounds of a basin system, or an aqueduct comprising a plurality of basin systems, or single basin system can be extended to centers of population which require or come to require a large volume of water. It should be understood that any one basin system can be considered to be a complete single-basin-system aqueduct; and that in many regions such single-basin-system aqueduct can give service throughout a great range of territory.

The fact that I can make the collection and impounding of a very great volume of water independent of variation in the distribution and periods of rainfall is a consideration of very great importance. The solution of those variables in a manner which resolves them not only from season to season but also over a period of years, assures an invariable minimum retention which makes a great volume of water available for controlled delivery at all times. This control in retention and delivery, not only gives assurance of water in adequate supply for industrial and domestic uses, but also renders the commonly useless and frequently destructive excess rainfall both harmless and useful.

Considering the conservation of excess to give a high minimum retention of water, that retention in its widespread application presents many advantages which are not immediately apparent. Thus it is readily apparent that the retention of water on the scale which has been disclosed is useful in preventing floods and in maintaining adequate flow through major watercourses during long periods of which rainfall varies widely. The basin system of my invention is, however, also useful in correcting flow through tributary streams in modification of what would normally be flood stage or deficiency of flow in those streams. Thus if there be in a tributary stream a deficiency of flow desired for irrigation, recreational purposes, or other purpose, at points downstream from the basin system such deficiency can be remedied from the great volume of collected and impounded excess water in the basin system. In addition to neutralizing the effects of local and general droughts of long or short duration and neutralizing the effects of widespread flood conditions the basin system of my invention neutralizes and makes useful the effect of local cloudbursts. If these occur on terrain included in the collection area of the basin system the excess water is collected and impounded. If they occur in areas lying downstream from the collection area flow into the downstream channels may be decreased with saving in the water usually discharged into such channels to maintain minimum flow therein.

By my operation in an interlocked basin system with the establishment of a widespread collection area and great volume of water available at widely separated points I create conditions of high corrective value. Thus it is to be understood that a cloudburst on a small portion of the area draining into any basin of the basin system is not only so retained as to prevent flooding of downstream channels in that locality but that I can use the water of the cloudburst to correct a deficiency of flow in downstream channels separated by many miles and numerous basins from the locality in which rainfall takes place. Another corrective feature inherent in the collection of water over a widespread area and in great volume by means of a method of interchanging flow is the blending of waters of different specific properties which takes place. By constant interchanging flow and under the conditions of long retention and repeated mixing which are thus established the waters from various sources can be blended to give a mean or average composition of the impounded waters and to create in them a desired constant uniformity. By including or excluding from the basin system the waters of various watrecourses in the manner described above, the mingling of waters for blending can be made selective.

This is well illustrated in Fig. VI of the drawings, which shows what may be considered a typical arrangement of watercourses in the source district in which the collection of water is to a major extent effected. Such districts, as has been noted, commonly lie at a higher level than the centers of population, which usually are located in "downstream" districts and along the lower-lying valleys of the greater rivers. It will be seen in this figure of the drawings how the valleys of the small branching tributaries in such collection area approach each other to make interconnection effective, and how the widespread collection and retention area gives good control both of the volume of water retained and the volume of water released. It makes clear that there is not only a great volume of impounded water subject to withdrawal for local use or for conveyance by extension to remote points of delivery, but that the basin system gives accurate control of flow from it and a partial control of flow in the larger watercourses. This figure of the drawings, which indicates the impounding and interconnection of bodies of water in a large number of watercourses by the same letters of general reference used in preceding figures of the drawings, also makes clear the manner in which a great volume of water can be impounded without widespread inundation of the terrain. It supports the statement, given above, that the practice of my invention is greatly aided by the fact that in well-watered upland regions the natural contour of the terrain and the distribution of watercourses is most favorable to that practice.

It is possible to enumerate many advantages which derive from the practice of the method by which I collect, impound, convey, and in controlled and apportioned manner deliver great volumes of water. Such advantages comprise providing a high minimum volume of retention throughout periods of varied local and widespread rainfall and drought; the conveyance of water by extension for use at widely separated points; and normalizing the volume of water in those watercourses to which water is released in apportioned quantity from the large volumes of impounded water.

An advantage of my method which has not been noted previously herein, is that is provides deep and wide waterways of maintained minimum depth for navigation within the basin system, as well as promoting navigation in waterways below the basin system by normalizing the flow therein.

I claim as my invention:

1. The method of supplying water in large volume which comprises impounding the waters of a multiplicity of watercourses over a wide collection area by damming each of the said watercourses to a height sufficient to permit the several bodies of impounded water to lie at a common surface level, and causing the said several bodies of water so impounded to seek a common surface level by corrective interchanging flow therebetween in response to tendencies toward different surface levels in the said several impounded bodies of water caused by subtractions from and additions to the volume of any of the said several bodies.

2. The method of supplying water in large volume which comprises impounding the waters of a multiplicity of watercourses over a wide collection area by damming each of the said watercourses to a height sufficient to permit the several bodies of water impounded to lie at a common surface level, causing the said several bodies of impounded water to seek a common surface level by corrective interchanging flow therebetween in response to tendencies toward different surface levels in the said several bodies of water caused by subtractions from and additions to the volume of any of the said several bodies, and delivering from the total volume of water so impounded water conveyed by extension and without substantial loss of gravity head to the point of its delivery.

3. The method of supplying water in large volume which comprises impounding the waters of a multiplicity of watercourses over a wide collection area by damming each of said watercourses to a height sufficient to permit the several bodies of impounded water to lie at a common surface level, causing the said several bodies of impounded water to seek a common surface level by corrective interchanging flow therebetween in response to tendencies toward different surface levels in the said several impounded bodies of water caused by subtractions from and additions to the volume of any of the said several bodies, withdrawing to lower stages of the dammed watercourses apportioned quantities of the total volume of impounded water, and delivering from the total impounded volume of water apportioned quantities conveyed by extension and without substantial loss of gravity head to the point of delivery.

4. The method of supplying water in large volume which comprises impounding the waters in a series of interconnected basin systems each of which lies within a widespread collection area by damming a multiplicity of watercourses in each of the said collection areas to a height to permit the several bodies of impounded water in each basin system to seek a common surface level by corrective interchanging flow therebetween in response to tendencies toward different surface levels in the said several bodies of water caused by subtractions from and additions to any of the said several bodies, and discharging from each higher-lying basin system into a lower-lying basin system of the series by delivering thereto from the total volume impounded in the higher-lying basin system water conveyed by extension and without substantial loss of gravity head to the point of its delivery.

5. The method of supplying water in large volume which comprises impounding the waters of a multplicity of watercourses over a wide collection area by damming each of the said watercourses to a height sufficient to permit the several bodies of water impounded to lie at a common surface level, causing the said several bodies of water so impounded to seek a common surface level by corrective interchanging flow therebetween in response to tendencies toward different surface levels in the said several impounded bodies of water caused by subtractions from and additions to the said several bodies, and while maintaining minimum retention in the basin system composed of the said interchanging bodies of water releasing water in apportioned volume to watercourses lying below the said basin system correctively to provide continuously a determined normal flow therein.

6. The method of supplying water in large volume which comprises impounding the waters of a multiplicity of watercourses over a wide collection area by damming each of the said watercourses to a height sufficient to permit the several bodies of water so impounded to lie at a common surface level, causing the said several bodies of water so impounded to seek a common surface level by corrective interchanging flow therebetween in response to tendencies toward different surface levels in the said several impounded bodies of water caused by subtractions from and additions to the said several bodies, while maintaining minimum retention in the basin system composed of the said interchanging bodies of water releasing water in apportioned volume to watercourses lying below the said basin system correctively to provide continuously a determined normal flow therein, and delivering into channels other than the said watercourses from the total body of water so impounded water conveyed by extension and without substantial loss of gravity head to the point of its delivery.

7. The method of supplying water in large volume which comprises impounding the waters of a multiplicity of watercourses over a wide collection area by damming each of the said watercourses to a height sufficient to permit the several bodies of impounded water to lie at a common surface level, causing the said several bodies of impounded water to seek a common surface level by corrective interchanging flow therebetween in response to tendencies toward different surface levels in the said several bodies of water caused by subtractions from and additions to the said several bodies, conveying the water impounded in the basin-system so created by extension and without substantial loss of gravity head to a point adapted by substantial abrupt declivity to generation of energy from delivery of water, and at such point delivering water so conveyed with abrupt loss of gravity head for the generation of hydro-electric power.

8. The method of supplying water in large volume which comprises impounding the waters of a multiplicity of watercourses over a wide collection area by damming each of the said watercourses to a height sufficient to permit the several bodies of impounded water to lie at a common surface level, causing the said several bodies of impounded water to seek a common surface level by corrective interchanging flow therebetween in response to tendencies toward different surface levels in the said several bodies of water caused by subtractions from and additions to the said several bodies, conveying the water in the basin-system so created by extension and without substantial loss of gravity head to a point adapted by substantial abrupt declivity to generation of energy from delivery of water, at such point delivering water so conveyed with abrupt loss of gravity head for the generation of hydro-electric power, and withdrawing to lower stages of the dammed watercourses apportioned quantities of the total volume of impounded water.

9. The method of supplying water in large volume which comprises impounding the waters in a series of interconnected basin systems each of which lies within a widespread collection area by damming a multiplicity of watercourses in each of the said collection areas to a height to permit the several bodies of water so impounded to lie at a common surface level, causing the said several bodies of impounded water to seek a common surface level by corrective interchanging flow therebetween in response to tendencies toward different surface levels in the said several bodies of water caused by subtractions from and additions to any of the said several bodies, discharging from each higher-lying basin system into a lower-lying basin system of the series by delivering thereto from the total volume of water impounded in the higher-lying basin system water conveyed by extension and without substantial loss of gravity head to the point of its delivery, and from each basin system of the series delivering for use apportioned quantities of impounded water conveyed by extention and without substantial loss of gravity head in that basin system to the point of delivery.

10. The method of supplying water in large volume which comprises impounding the waters in a series of interconnected basin systems each of which lies within a widespread collection area by damming a multiplicity of watercourses in each of said collection areas to a height to permit the several bodies of impounded water to lie at a common surface level, causing the said several bodies of impounded water to seek a common surface level by corrective interchanging flow therebetween in response to tendencies toward different surface levels in the said several bodies of water caused by subtractions from and additions to any of the said several bodies, discharging from each higher-lying basin system into a series of delivering thereto from the total volume of water impounded in the higher-lying basin system water conveyed by extension and without substantial loss of gravity head to the point of its delivery, and while maintaining minimum retention in each basin system composed of a plurality of interchanging bodies of water releasing water in apportioned volume to watercourses lying below the said basin system correctively to provide continuously a determined normal flow therein.

11. The method of supplying water in large volume which comprises impounding the waters in a series of interconnected basin systems each of which lies within a widespread collection area by damming a multiplicity of watercourses in each of said collection areas to a height to permit the several bodies of impounded water to lie at a common surface level, causing the said several bodies of impounded water to seek a common surface level by corrective interchanging flow therebetween in response to tendencies toward different surface levels in the said several bodies of water caused by subtractions from and additions to any of the said several bodies, discharging from each higher-lying basin system into a lower-lying basin system water conveyed by extension and without substantial loss of gravity head to the point of its delivery, withdrawing to lower levels of the dammed watercourses of each such basin system apportioned quantities of the total volume of water impounded therein, and from each basin system of the series delivering for use apportioned quantities of impounded water conveyed by extension and without substantial loss of gravity head to the point of delivery.

12. The method of normalizing retention and delivery of water in and from a source district containing a multiplicity of branching watercourses over long periods of varying volume and distribution of rainfall, which comprises including in an interlocked basin system watercourses of such district in such number and distribution as to provide a collection area so widespread as to receive in some localities of its extent substantial increments of rainfall not concurrently received in other localities thereof and having a great total retention capacity and utilizing said total retention capacity under such variant rainfall, by damming the said included watercourses to a height to permit bodies of water impounded therein to lie at a common surface level and distributing subtractions from and additions to any of the said impounded bodies of water to all thereof by interchanging flow between the said bodies, releasing apportioned quantities of water to the reaches of the said watercourses lying below the dams therein, and delivering apportioned quantities of water to use from at least one of the said impounded bodies.

13. The method of normalizing retention and delivery of water in and from a source district containing a multiplicity of branching watercourses over long periods of varying volume and distribution of rainfall, which comprises including in an interlocked basin system watercourses of such district in such number and distribution as to provide a collection area so widespread as to receive in some localities of its extent substantial increments of rainfall not concurrently received in other localities thereof and having a great total retention capacity and utilizing said total retention capacity under such variant rainfall, by damming the said included watercourses to a height to permit bodies of water impounded therein to lie at a common surface level and distributing subtractions from and additions to any of the said impounded bodies of water to all thereof by interchanging flow between the said bodies, and releasing apportioned quantities of water to the reaches of the said watercourses lying below the dams therein.

14. The method of normalizing retention and delivery of water in and from a source district containing a multiplicity of branching watercourses over long periods of varying volume and distribution of rainfall, which comprises including in an interlocked basin system watercourses of such district in such number and distribution as to provide a collection area so widespread as to receive in some localities of its extent substantial increments of rainfall not concurrently received in other localities thereof and having a great total retention capacity and utilizing said total retention capacity under such variant rainfall, by damming the said included watercourses to a height to permit bodies of water impounded therein to lie at a common surface level and distributing subtractions from and additions to any of the said impounded bodies of water to all thereof by interchanging flow between the said bodies, and delivering apportioned quantities of water to use from at least one of the said impounded bodies.

15. The method of normalizing retention of water in a source district containing a multiplicity of branching watercourses over long periods of varying volume and distribution of rainfall, which comprises including in an interlocked basin system watercourses of such district in such number and distribution as to provide a collection area so widespread as to receive in some localities of its extent substantial increments of rainfall not concurrently received in other localities thereof and having a great total retention capacity and utilizing said total retention capacity under such variant rainfall, by damming the said included watercourses to a height to permit bodies of water impounded therein to lie at a common surface level and distributing subtractions from and additions to any of the said impounded bodies of water to all thereof by interchanging flow between the said bodies.

16. The method of normalizing retention and delivery of water in and from a source district containing a multiplicity of branching watercourses over long periods of varying volume and distribution of rainfall, which comprises including in an interlocked basin system watercourses of such district in such number and distribution as to provide a collection area so widespread as to receive in some localities of its extent substantial increments of rainfall not concurrently received in other localities thereof and having a great total retention capacity and utilizing said total retention capacity under such variant rainfall, by damming the said included watercourses to a height to permit bodies of water impounded therein to lie at a common surface level and distributing subtractions from and additions to any of the said impounded bodies of water to all thereof by interchanging flow between the said bodies, conveying water impounded in the basin system so created by extension and without substantial loss of gravity head to a point adapted by substantial abrupt declivity to generation of energy from delivery of water, and at such point delivering water so conveyed with abrupt loss of gravity head in the generation of hydro-electric power.

CYRIL C. CRICK.

No references cited.